(No Model.)
L. S. COPPER.
BICYCLE SADDLE.
No. 327,770. Patented Oct. 6, 1885.
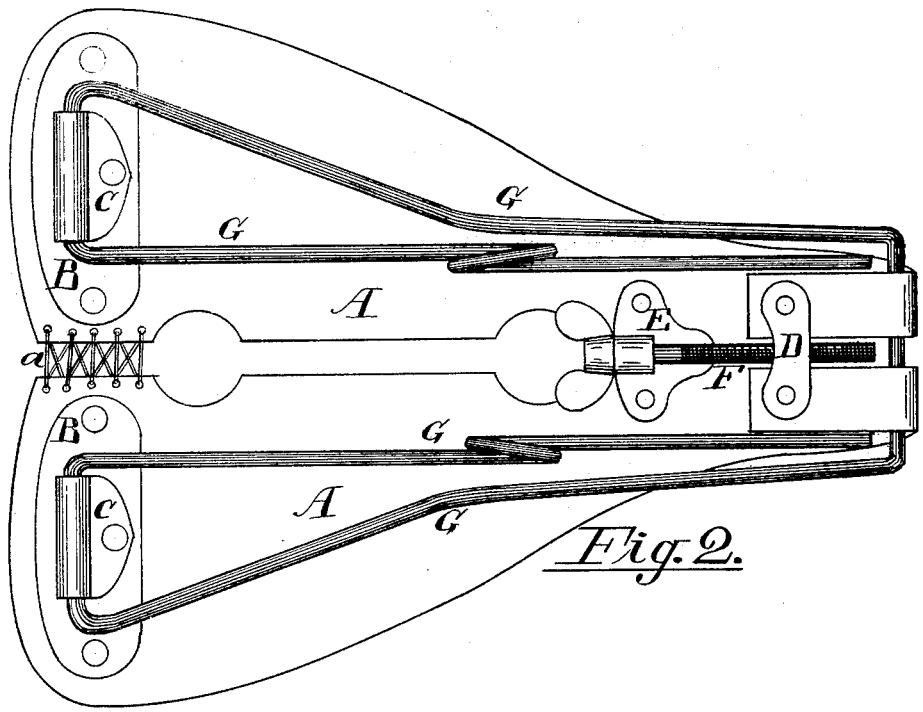
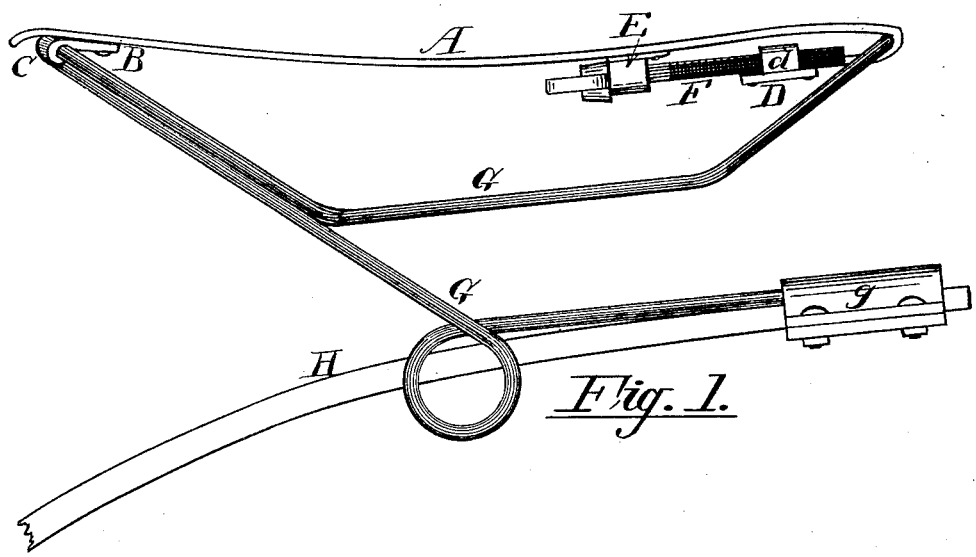
Witness,
Geo. B. Tibbitts.
P. R. Tibbitts.
Inventor,
Luther S. Copper,
By Geo. W. Tibbitts atty

United States Patent Office.

LUTHER S. COPPER, OF CLEVELAND, OHIO.

BICYCLE-SADDLE.

SPECIFICATION forming part of Letters Patent No. 327,770, dated October 6, 1885.

Application filed April 18, 1885. Serial No. 162,621. (No model.)

*To all whom it may concern:*

Be it known that I, LUTHER S. COPPER, of Cleveland, in the county of Cuyahoga and State of Ohio, have invented certain new and useful Improvements in Bicycle-Saddles, of which the following is a specification.

This invention relates to saddles for bicycles, and has for its object to provide a perfectly easy and comfortable saddle; and it consists of a peculiarly-constructed spring for supporting the saddle, as hereinafter fully described and claimed.

In the accompanying drawings, Figure 1 is a side view, and Fig. 2 is an under side view of a saddle having my improved springs attached.

A is the seat, which is made of strong leather, and which is bisected about two-thirds of its length from rear end toward the front, and the two parts are united at the rear end of the space by a lacing-cord, $a$, which enables the space to be closed, more or less, for comfort or convenience.

To the under side of the said seat are secured curved plates B B, by rivets or otherwise, and to these plates are pivotally joined socket-plates C C. The front end of the seat is also bisected, and the two ends are folded under and have a plate, D, attached provided with a nut, $d$.

E is also a plate secured to the under side of the seat and provided with a thumb-screw, F, working in the aforesaid nut $d$. This is for regulating the length and spring of the seat.

G is a spring-support to the said seat, and consists of a strong wire bent in the form shown from one piece, as follows: The ends are secured in a clip, $g$, to the backbone H of the bicycle. From said clip the wires pass back and are bent into coils $i\ i$ about midway beneath the seat. They thence slant upward to the back of the seat, where they are bent toward each other, and are there held in the socket-plates C C. From thence they again pass forward, are bent downward to a point near the coils, thence forward and again upward to the forward end of the seat, where the wire is passed through the fold of the seat, it being bent or folded to fit the said fold of the seat-leather, and thus the springs are united and form a double spring-support very easy and pleasant to the rider.

The springs may be reversed in position for obtaining the like results. This, however, would require a slight change in the form of the spring; but the form shown is preferable.

Having described my invention, I claim—

The combination, with the bisected seat A, provided with the plates B B at the rear, the lacing-cord $a$, and the plate D, having nut $d$, and the plate E, provided with thumb-screw F at forward end, of the spring-supports G G, formed from one piece of wire and bent into the shape shown and attached to said seat A, and secured to the backbone H of bicycle by clip $g$, substantially in the manner described and for the purpose specified.

LUTHER S. COPPER.

Witnesses:
GEO. W. TIBBITTS,
M. G. NORTON.